United States Patent [19]
Chantelou

[11] Patent Number: 4,933,763
[45] Date of Patent: Jun. 12, 1990

[54] METHOD OF AND ARRANGEMENT FOR CODING DIGITAL VIDEO SIGNALS AND CORRESPONDING DECODING ARRANGEMENT

[75] Inventor: Olivier Chantelou, Paris, France

[73] Assignee: U.S. Philips Corporation, New York, N.Y.

[21] Appl. No.: 310,803

[22] Filed: Feb. 14, 1989

[30] Foreign Application Priority Data

Feb. 29, 1988 [FR] France ................................ 88 02445

[51] Int. Cl.$^5$ ...................... H04N 7/133; H04N 7/137
[52] U.S. Cl. .................................... 358/136; 358/105; 375/122
[58] Field of Search ............... 358/133, 135, 136, 105; 375/122

[56] References Cited

U.S. PATENT DOCUMENTS

| | | | |
|---|---|---|---|
| 4,394,774 | 7/1983 | Widergren | 358/136 |
| 4,691,329 | 9/1987 | Juri et al. | 358/136 |
| 4,704,628 | 11/1987 | Chen et al. | 358/136 |
| 4,800,425 | 1/1989 | Schwerzel | 358/105 |
| 4,802,005 | 1/1989 | Kondo | 358/105 |

Primary Examiner—Howard W. Britton
Attorney, Agent, or Firm—Edward W. Goodman

[57] ABSTRACT

Method of coding images converted into digital video signals in accordance with a format having three-dimensional blocks of the signals, wherein the method includes the following preliminary steps:

(a) estimation of a principal movement from image to image for associating a displacement vector with each image, with respect to the preceding image, said principal vector being the vector for which the image-to-image difference is minimum, and;

(b) scan conversion with a view to defining the format of the three-dimensional blocks by dividing the sequence of video signals corresponding to images into groups each corresponding to N consecutive images and by defining within each of these groups the three-dimensional blocks based on M lines, and P pixels per line on the one hand, in the image plane and, on the other hand, N successive planes corresponding to n images of the group; the N two-dimensional blocks of M lines by P pixels which compose each three-dimensional block of one and the same group being spatially shifted from one image to the next by the said displacement vector estimated for each image.

6 Claims, 5 Drawing Sheets

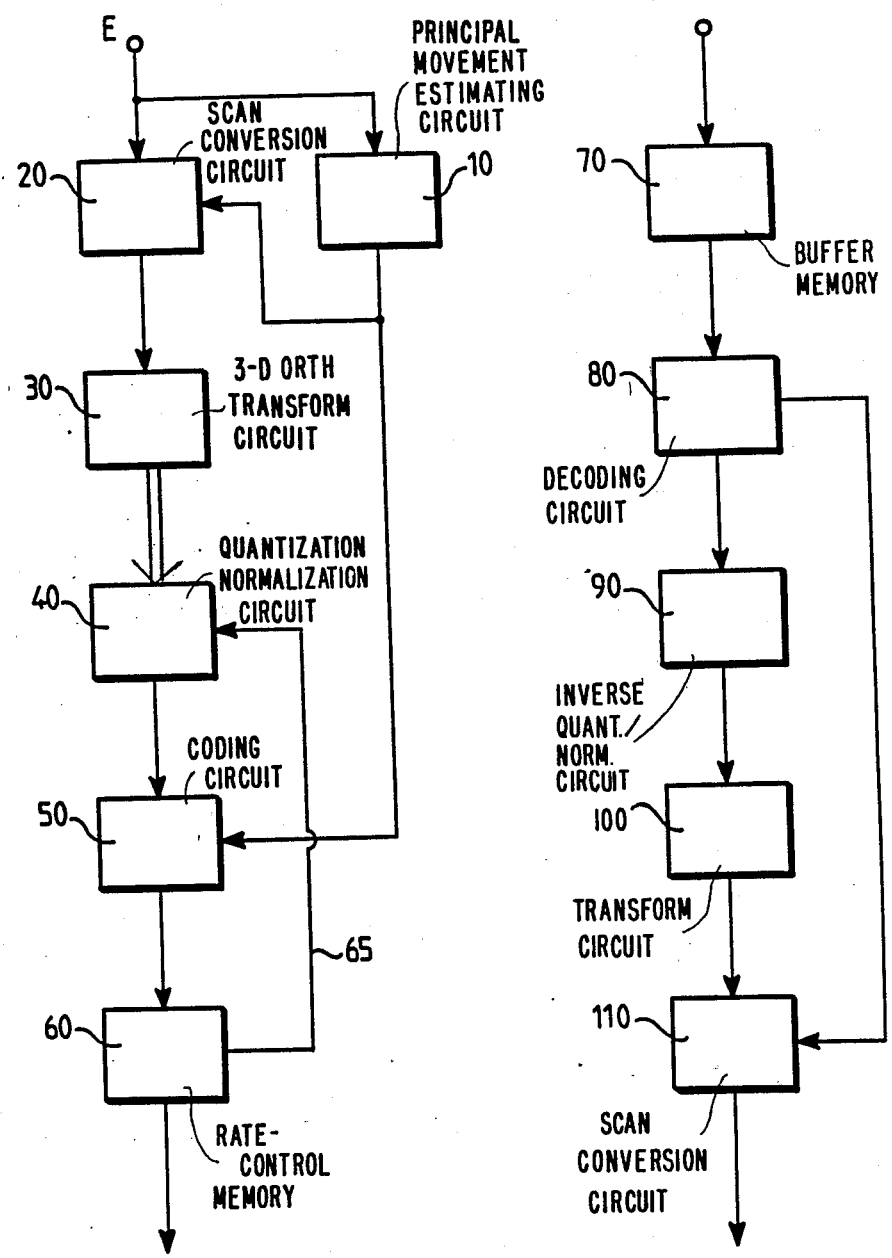

METHOD OF AND ARRANGEMENT FOR CODING DIGITAL VIDEO SIGNALS AND CORRESPONDING DECODING ARRANGEMENT

BACKGROUND OF THE INVENTION

1. Field of the Invention

The present invention relates to a method of coding images converted into digital video signals in accordance with a format composed of three-dimensional blocks of said signals.

The invention also relates to a coding arrangement for carrying out such a method and to a corresponding decoding arrangement.

This invention is essentially applied in the field of television for the transmission and/or recording of television signals. The coding arrangement according to the invention is arranged in the transmitting section of the transmission system and the corresponding decoding arrangement is arranged in its receiving section.

The transmission or recording of video signals in a digital form provides the possibility of considerably reducing the influence of channel or read noise on the quality of the displayed image and of easily including these digital signals in telephone-type digital networks. Nevertheless, the digitization of a sequence of television pictures is expressed by a very high data rate which generally cannot be directly transmitted or recorded on the existing carriers (this rate is 216 Mbit/s for digitized color television signals in accordance with notice 601 of the CCIR). It is thus essential to reduce this rate for adapting the signal to practical rates.

2. Description of Related Art

U.S. Pat. No. 4,394,774 describes a method with which this rate can be reduced by a factor of 10 to 20. This technique, which is based on the utilization of orthogonal transforms, provides the possibility of benefiting from the redundancy between neighboring samples within the image: it consists of dividing the image into blocks having an identical size and subjecting each block to an orthogonal transform which has the property of decorrelating the samples of the block by concentrating the energy on a small number of samples.

In order to benefit equally from the image-to-image redundancy present in the stationary parts of the image, this technique is often combined with an inter-frame prediction technique. According to this technique either the block itself is transmitted (intra-frame mode) or the difference between this block and the block having the same spatial position in the preceding image after coding and decoding (inter-frame mode) so that the block having the minimum energy is transmitted.

This image-to-image prediction operation thus introduces a time-recursivity of the coding operation, that is to say that it is only possible to decode an image if the preceding decoded image is available. This characteristic has, as a consequence, a risk that an error appearing at the reception or during reading of the band will subsist in various images, in fact as long as the block in which this error has appeared is coded in accordance with the inter-frame mode.

Moreover, this recursivity is incompatible with consumer video recording because it precludes random access to images, which access is necessary for realizing the "quick search" mode. In certain cases, a remedy to this drawback is to encode one image out of N in the intra-frame mode but, as this degrades the quality of displayed images, N is chosen to be large to limit this degradation, which limits the range of improvement.

SUMMARY OF THE INVENTION

It is an object of the invention to propose a method of coding video signals which provides the possibility of benefiting from image-to-image correlation without introducing image-to-image recursivity, that is to say, a method which is compatible with consumer video recording and which is less sensitive to channel errors.

To this end the invention relates to a coding method, characterized in that it comprises the following preliminary steps:

(a) estimation of a principal movement from image to image for associating a displacement vector with each image, with respect to the preceding image, said principal vector being the vector for which the image-to-image difference is minimum, and;

(b) scan conversion with a view to defining the format of the three-dimensional blocks by dividing the sequence of video signals corresponding to images into groups each corresponding to N consecutive images and by defining within each of these groups the three-dimensional blocks including M lines and P pixels per line, on the one hand, in the image plane and, on the other hand, N successive planes corresponding to N images of the group, the N two-dimensional blocks of M lines by P pixels which compose each three-dimensional block of one and the same group being spatially shifted from one image to the next by the displacement vector estimated for each image.

The method thus proposed provides the possibility of using the temporal redundancy of the signals thanks to the decorrelation realized by means of the orthogonal transform in the stationary parts of the images without a substantial displacement, but also in the case of a general movement of the scene or of the camera and even in the case where a movement affects a large part of the scene. In the latter two cases, the proposed method is superior to the method using the inter-and intra-frame modes because it uses the inter-frame correlation while the inter/intra-frame process does not take these displacements into account.

Moreover, as its effect is limited to N images, this process does not introduce any image-to-image recursivity during coding and thus ensures a satisfactory immunity to noise and compatibility with the "quick search" mode provided in video recorders.

This process is particularly efficient if it is utilized for reducing the rate of video signals having a non-interlaced image format. If the available signals are interlaced, the format is converted before coding, which produces non-interlaced video signals.

The document EP-0,255,289 describes a method and an arrangement for coding digital video signals, notably comprising the following steps:

splitting up the images in three-dimensional blocks comprising m lines and n pixels per line in the image plane, on the one hand, with m=n=6 in the example described and successive planes, on the other hand, (2 in the example described) corresponding to as many successive images and positions and identical dimensions in these successive images;

detection of movement in each of these blocks with a view to the transmission of a distinct code according to whether the current block is mobile, quasi-immobile or immobile;

two-dimensional average coding of the blocks when they are considered immobile or quasi-immobile, or three-dimensional coding of these blocks when they are considered mobile.

It thus appears that the considered three-dimensional blocks have a well-defined temporal form which is repetitive and fixed in advance. The detection of movement carried out within each of them is intended to simplify the treatment when there is absence of movement by reducing the three-dimensional blocks to two-dimensional blocks calculated by means of an arithmetical averaging operation.

In the present case there is no difference of treatment between the three-dimensional blocks which are and remain treated as such. The detection of movement is not limited here to a reduction of the number of coding data by suppression of the three-dimensional character of the blocks which are considered as immobile, but, on the other hand, it is completed by an estimation of this movement expressed with the aid of a motion vector which provides the possibility of successively constructing each three-dimensional block from the first two-dimensional block of which it is composed.

Thus, rather than being constituted by previously defined two-dimensional blocks having an identical spatial position, each three-dimensional block is found to be constituted by two-dimensional blocks presenting among themselves a certain spatial correlation and being afterwards associated with one another as a function of spatial shifts corresponding to the previously determined displacement vectors, which involves a temporal redundancy of information ultimately providing the possibility of very efficiently reducing the number of coding data corresponding to these three-dimensional blocks.

Another object of the invention is to propose a simple example of realizing an arrangement for coding digital video signals by which the above-defined coding method can be carried out.

To this effect the coding arrangement according to the invention, which notably comprises a circuit for coding digital values which are representative of said signals, is characterized in that:

the coding also comprises, prior to this coding circuit, a circuit for estimating the principal movement from image to image and a scan-conversion circuit;

the circuit for estimating the principal movement comprises a register for storing, on the basis of input samples which it receives, samples which are representative of each image, a first and a second memory for alternately writing in one of them the assembly of samples which are representative of an image, referred to as current image, and for simultaneously reading out of the other one of the two memories the samples which are representative of an image which is the image previously written, a subtractor for calculating the interframe error by means of a difference between the samples which have been read and the corresponding input samples, a circuit for calculating the absolute value, a circuit for calculating the cumulated error and a circuit for determining the minimum cumulated error and for calculating the displacement associated with the minimum cumulated error, whose output is a displacement vector of the current image with respect to the preceding image and which is applied to the scan-conversion circuit, on the one hand, and to the coding circuit, on the other hand;

said scan-conversion circuit comprises a third and a fourth memory for storing input samples in the number corresponding to the desired temporal length for the three-dimensional blocks, said memories equally functioning as flip-flops, and a circuit for constituting the three-dimensional blocks by associating, in a number corresponding to the temporal length of these blocks, two-dimensional spatial blocks shifted one with respect to the next by the corresponding displacement vector determined by the circuit for estimating the principal movement.

If the video signals have a non-interlaced format, the proposed arrangement is used as such. If, on the other hand, these signals have an interlaced format, the arrangement is preceded by a circuit for converting the interlaced format into a non-interlaced format.

BRIEF DESCRIPTION OF THE DRAWINGS

The details of the invention will now appear in a detailed manner in the following description and in the accompanying drawings given by way of non-limiting examples, and in which:

FIGS. 1 and 2 show respective embodiments of a coding arrangement for carrying out the coding method according to the invention and of the corresponding decoding arrangement;

DESCRIPTION OF THE PREFERRED EMBODIMENT

Figure 3:
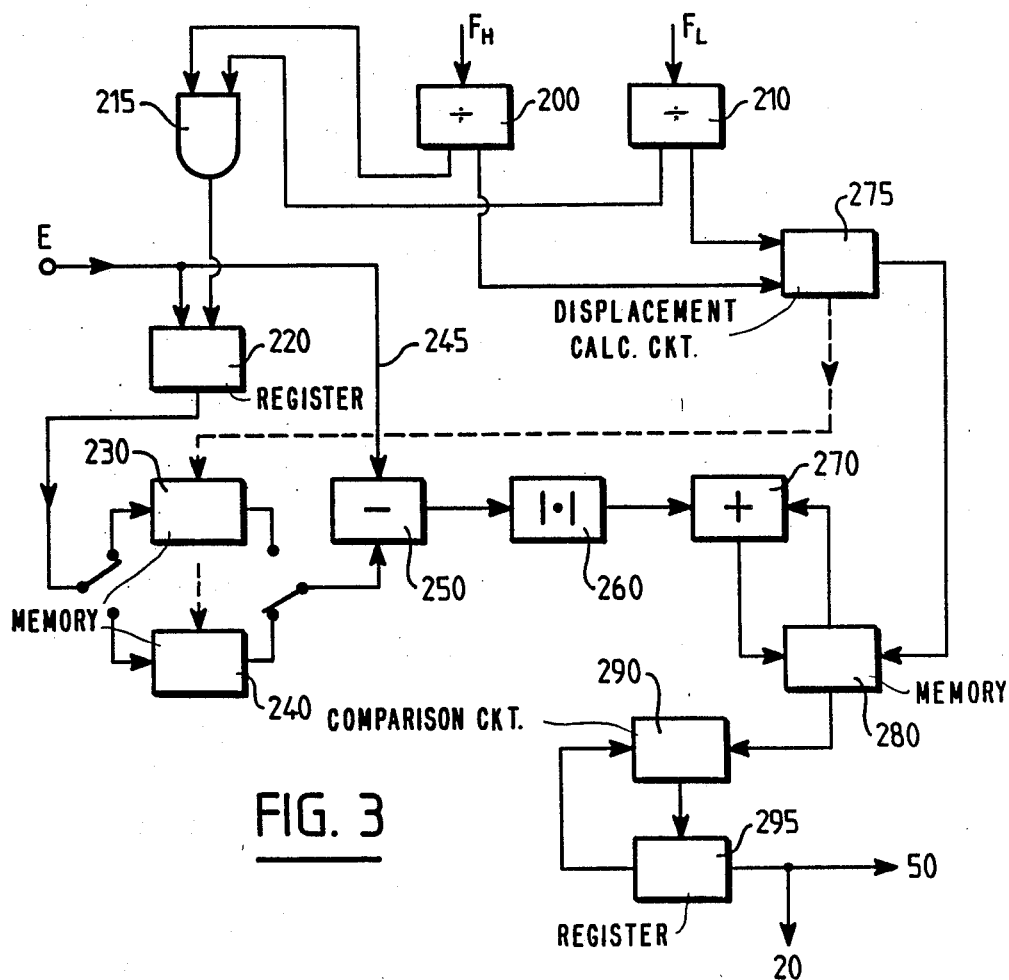
FIGS. 3 and 4 show embodiments of the circuit for estimating the principal movement and of the scan conversion circuit of FIG. 1.

Before describing the invention itself, it will be remembered that it is known, notably from U.S. Pat. No. 4,394,774 cited hereinbefore to carry out a coding of digital video signals, using the following steps: orthogonal transform, normalization, quantization, coding proper and controlling the rate.

With each image divided into blocks of M lines and P pixels per line, the object of the conventional two-dimensional orthogonal transform of video signals is to obtain, for each successively considered block, a two-dimensional sequence of coefficients which are more independent than the values which are available before transform. Statistic measures have in effect shown a very strong correlation between neighboring pixels in a field or an image and the coefficients obtained by orthogonal transform are characterized by a reduction of this correlation.

The normalization weights the coefficients thus obtained by multiplying them or by dividing them by a normalization factor associated with one or several parameters of which at least the instantaneous rate of available data at the end of the coding process steps and possibly parameters associated with the contents themselves are subjected to coding. The quantization, which is linear or which has a variable pitch, converts the normalized value of each coefficient expressed with a floating point into an integral value, either by simple rounding off or by truncation by taking the integral part of the value before quantization.

Coding of the normalized and quantized values is thus realized by means of the table of values generally coded in accordance with a Huffman code and representing either coefficient values (variable length coding) or lengths of runs (run length coding). The available coded values having a variable rate at the end of this operation are restored with a constant rate thanks to the presence of a rate control, while at least one information component associated with this rate control is returned upstream for fixing the value of the normalization factor of the coefficients, as has been stated hereinbefore.

According to the invention the coding process, which constitutes the object of the present invention, comprises the following preliminary steps: on the one hand, a step referred to as principal frame-to-frame estimation of movement and, on the other hand, a step referred to as scan conversion.

The movement estimation step enables of associating with each image, with respect to the preceding image, a principal displacement vector for which the image-to-image difference is a minimum. The step of scan conversion realizes an original reading of the successive signals in the sense that the continuous sequence of images is divided into groups of N images within each of which three-dimensional blocks are constituted which are composed of M lines and P pixels per line in the image plane and of N successive planes corresponding to the N images of the group. In each three-dimensional block, the N two-dimensional blocks of M lines and P pixels are spatially shifted from one image to the next by the displacement vector estimated for each image. The reduction of correlation is thus effected by a three-dimensional orthogonal transform which, in the same way as the already mentioned ultimate processing steps, now relates to the three-dimensional blocks constituted in accordance with the invention.

For carrying out the coding method according to the invention, an embodiment of a coding arrangement is shown in FIG. 1 and the corresponding decoding arrangement is shown in FIG. 2. These two Figures show arrangements working with images having a non-interlaced format with a three-dimensional orthogonal transform of the discrete cosine transform type (DCT) applied to the blocks having a size of 8 lines by 8 pixels by 4 images.

As indicated in FIG. 1, the coding arrangement according to the invention comprises a circuit 10 for estimating the principal movement, which circuit is shown in greater detail in FIG. 3. In FIG. 3, a register 220 receives line-by-line at its input E (also shown in FIG. 1) the samples of the image and selects one sample per block (for example per block of 16 pixels and 16 lines) in the image using the circuits 200 and 210 for dividing the clock frequency $F_H$ (or the frequency of the pixels) and the line frequency $F_L$ by 16. A logic AND circuit 215 arranged at an output of the circuits 200 and 210 controls the storage of the sample at the input E in the register 220. This sample is subsequently stored in one of the two memories 230 and 240 as well as all the other samples which are representative of the same image. During this period, the samples which are representative of the preceding image are read from the other one of the two memories 230 and 240.

When all the samples which are representative of the current image have been stored, that is to say at the end of the image, the role of the two memories 230 and 240 is inverted: when the first samples of the next image reach the input of the estimation circuit 10, the samples which are representative of the current image are read in from one of the memories 230 or 240 with read commands which are shifted over 8 line periods and 8 pixel periods with respect to the commands of the circuit 220. Thus, the samples of the next image coming directly from the input E by means of the connection 245 reach one of the inputs of a subtractor 250 while at the other input of this subtractor the sample which is present corresponds to the representative pixel which is spatially closest to the sample arriving at the connection.

The relative position of the sample with respect to the representative pixel which is present at the input of the subtractor 250 is the displacement corresponding to the inter-frame error calculated by this subtractor. Thus, the subtractor 250 and the circuit for calculating the absolute value 260 provide for each representative pixel the absolute value of the inter-frame differences associated with the displacement vectors considered in this case in a zone of about 8 pixels per image and about 8 lines per image.

A circuit 275 for calculating the displacement determines from the remainders of the division by 16 of the pixel frequency $F_H$ and the line frequency $F_L$ the displacement which is associated with each error from the circuit 260 for calculating the absolute value. This displacement, comprising a horizontal component and a vertical component, is obtained by shifting the remainder of the division of the pixel frequency $F_H$ (or the line frequency, respectively) defined by 0 to 15 over $-8$ pixels (or lines, respectively) by advance compensation of reading the memories 230 and 240 (by 8 pixels, or 8 lines, respectively) with respect to the control of the register 220 and by delay compensation introduced by the calculations realized with the aid of the circuits 250 and 260 (subtractor and circuit for calculating the absolute value). This displacement provides the possibility of reading from the memory 280 for the displacement in question the error which is cumulated in the representative preceding pixels of the image, which is an error calculated by the adder 270 by addition to the current elementary error from the circuit 260 for calculating the absolute value. The new value is then stored in the memory 280 at the position of the preceding value.

Thus, by accumulating with the adder 270 and a memory 280 the elementary terms of all the pixels which are representative of an image by a given displacement, a simplified displacement search in accordance with the method referred to as block matching method or in accordance with a method of the same type is realized. The determination of the vector chosen is realized by means of a comparison circuit 290 and by a register 295 which sequentially determines the minimum cumulated inter-frame error.

At the end of the image the register 295, which is intended to store the minimum error and the associated displacement, is initialised at the maximum error value. The content of the memory 280 is subsequently read consecutively for all the displacements. The comparison circuit 290 compares the cumulated error value in the register 295 with that from the memory 280. If the error in this register 295 is less than or equal to that from the memory 280, the content of the register is not modified. In the opposite case, the register 295 stores the new error value from the memory 280 and the associated displacement.

When all the cumulated errors have been subjected to the comparison circuit 290, the register 295 thus contains the displacement which minimizes the cumulated error. This displacement is then defined as that of the current image with respect to the preceding image and as such it is applied, on the one hand, to a scan-conversion circuit 20 (see FIG. 1) and, on the other hand, with a view to its multiplexing and its transmission to the decoding arrangement according to the invention, it is applied to a coding circuit 50 which will be described hereinafter.

Figure 4:
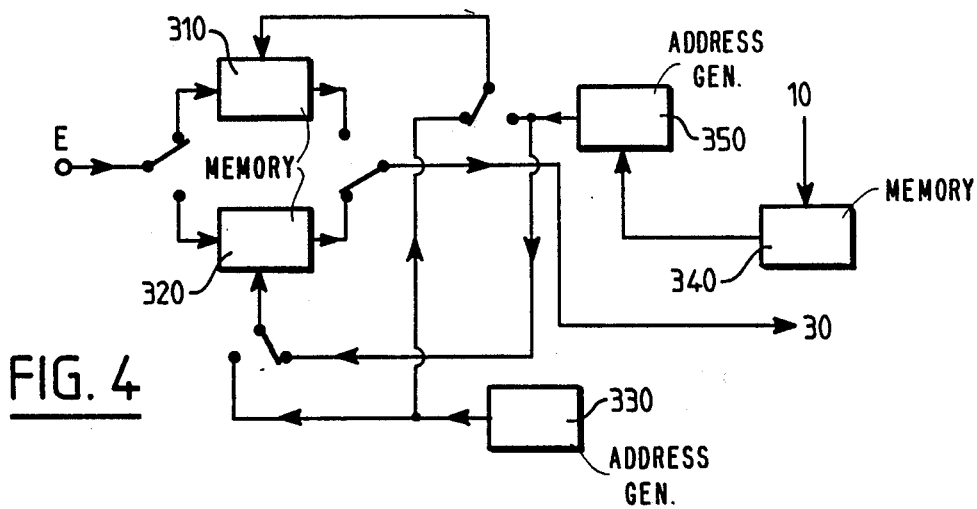

As indicated in FIG. 4, the scan-conversion circuit 20 comprises two memories 310 and 320, here for four images (contents corresponding to the temporal length of the three-dimensional blocks) operating as a flip-flop: while the samples of the four current images from the input of the coding arrangement are written in one of the memories 310 or 320 with the aid of an address generator 330, the other memory 320 or 310 provides successively all the three-dimensional blocks of the four preceding images and for each three-dimensional block it provides successively the samples of the four two-dimensional blocks by which it is constituted and which are associated with the four successive images. It will be remembered that the three-dimensional blocks are constituted by four two-dimensional spatial blocks one of which is shifted with respect to the next by the displacement vector estimated by the circuit 10 and stored in a memory 340 with the aid of four address counters, one for each image, provided in the address generator 350 and initialized by pixel and line values shifted (from one image to the other) by the displacement vector estimated for these images stored in the memory 340.

A circuit 30 for three-dimensional orthogonal transform arranged at the output (see FIG. 1) of the scan-conversion circuit 20 realizes the three-dimensional orthogonal transform by arranging three one-dimensional orthogonal transform circuits in cascade, separated by scan-conversion memories. Thus one goes from line scanning to column scanning, then from column scanning to image-to-image scanning in the manner as described in U.S. Pat. No. 4,394,774 by introducing a supplementary step for realizing the transform in accordance with the third temporal dimension.

A normalization and quantization circuit 40 receives the samples transformed by the circuit 30 and realizes the normalization and quantization of these samples, for example in the manner described as follows.

Figure 7:
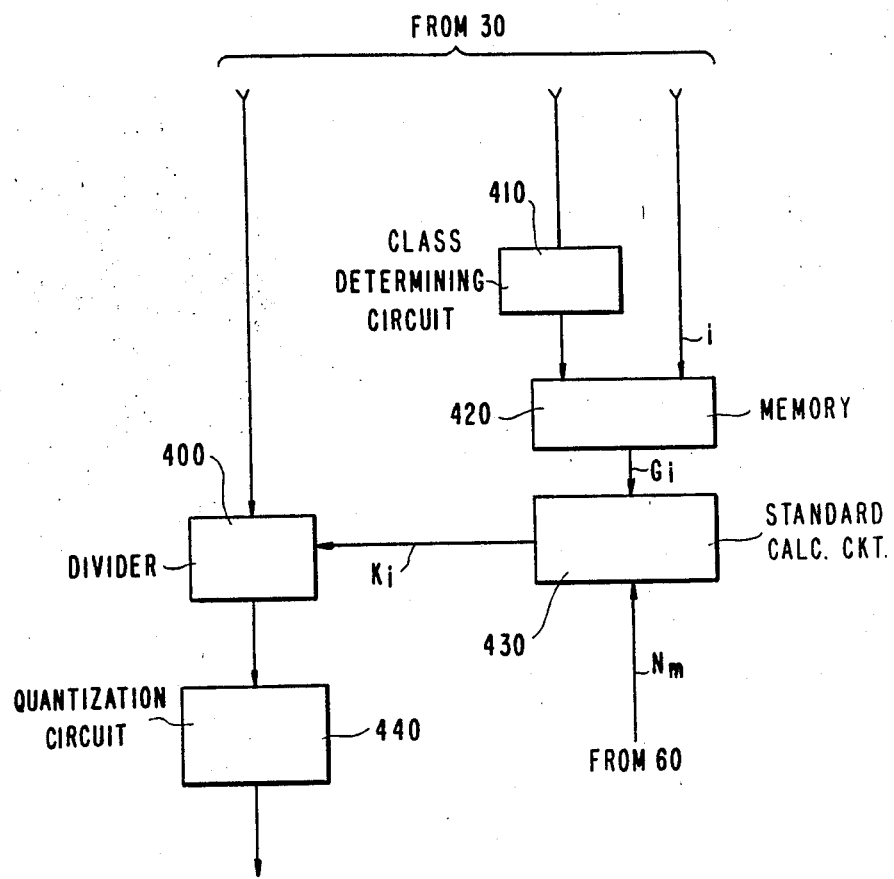
FIG. 7 shows a block diagram of the normalization and quantization circuit.

As shown in FIG. 7, this normalization and quantization circuit 40 comprises a divider 400 for dividing the output of the scan-conversion circuit 30 by a parameter $K_i$ which is determined as indicated hereinafter. On the one hand, this parameter $K_i$ is considered as being dependent on the position in the current block of the coefficient which occurs at the "dividing" input of the divider 400, i.e. of the coefficient obtained once the scan conversion has been effected. On the other hand, this parameter $K_i$ depends on the average standard $N_m$ imposed on the block, i.e. the filling rate of the rate-control memory 60, which is arranged as described hereinafter.

The parameter $K_i$ is also considered as being dependent on the class of activity of the current block which, according to the block considered, is uniform or quasi-uniform or which, on the other hand, contains contours having a more or less strong contrast, and will translate the more or less great importance of the average luminance which is given to the block considered. Various modifications of the definition of the class can be used. The activity criterion adopted in this case is to search in a block the expression max $F_i(u, v)$ with i=2 to (uxv), $F_i(u, v)$ being the value of the coefficient of the order i after orthogonal transform and scan conversion and (uxv) being the total number of coefficients of the block. The first coefficient is excluded from this search. This coefficient situated at the head of the matrix of coefficients of each is block is coded in a particular manner (for example linear quantization followed by coding by nine bits) for avoiding that differences is luminance between one block and another are noticed by the human eye. But other criteria for defining the activity can be used, for example the value of the sum of the squared coefficients.

The position in the current block is provided by the index i, supplied by the circuit 30, which affects each coefficient. The average standard imposed on the current block, which is a value which is higher as the rate-control memory 60 is fuller, is provided by a connection 65 from the output of the said rate-control memory 60.

The activity class in the example described is given by threshold comparison of the absolute value of the coefficients (with the exception of the first). In the present case three thresholds and thus four activity classes have been used. The comparison is effected in a class determining circuit 410 which receives an output from the circuit 30. The thresholds are previously defined, for example either with the aid of subjective tests as a function of the classification which is considered to be preferable among a certain number of reference images, or by equidistantly partitioning the blocks in the different classes, the weakest activity thus corresponding to the case where the considered block is practically uniform or where it has low-contrast contours.

As a function of the class thus defined and of the position in the block provided by the index i, a memory 420 within the normalization and quantizing circuit 40 receives the index i and the output from circuit 410 provides a coefficient $G_i$ which is applied to a circuit 430 for calculating the standard, which circuit 430 weights the value of the average standard $N_m$ from the rate-control memory 60 using the coefficient $G_i$ and finally supplies the parameter $K_i$ which is applied to the "divider" input of the divider 400. The output from the divider 400 is then applied to a quantization circuit 440.

It is known that in its turn the quantization operation is used to convert the normalized value of each coefficient expressed with a floating point into an integral value, either by simple rounding off or preferably by truncation by taking the integral part of the value before quantization. It is evident that, subjected to such a quantization, a certain number of values between 0 and 1 is replaced by the value 0, which reduces the number of significant coefficients to be transmitted and which thus tends towards compression of the searched data. This quantization operation may be linear or, in contrast, it may have a variable pitch.

Figure 5:
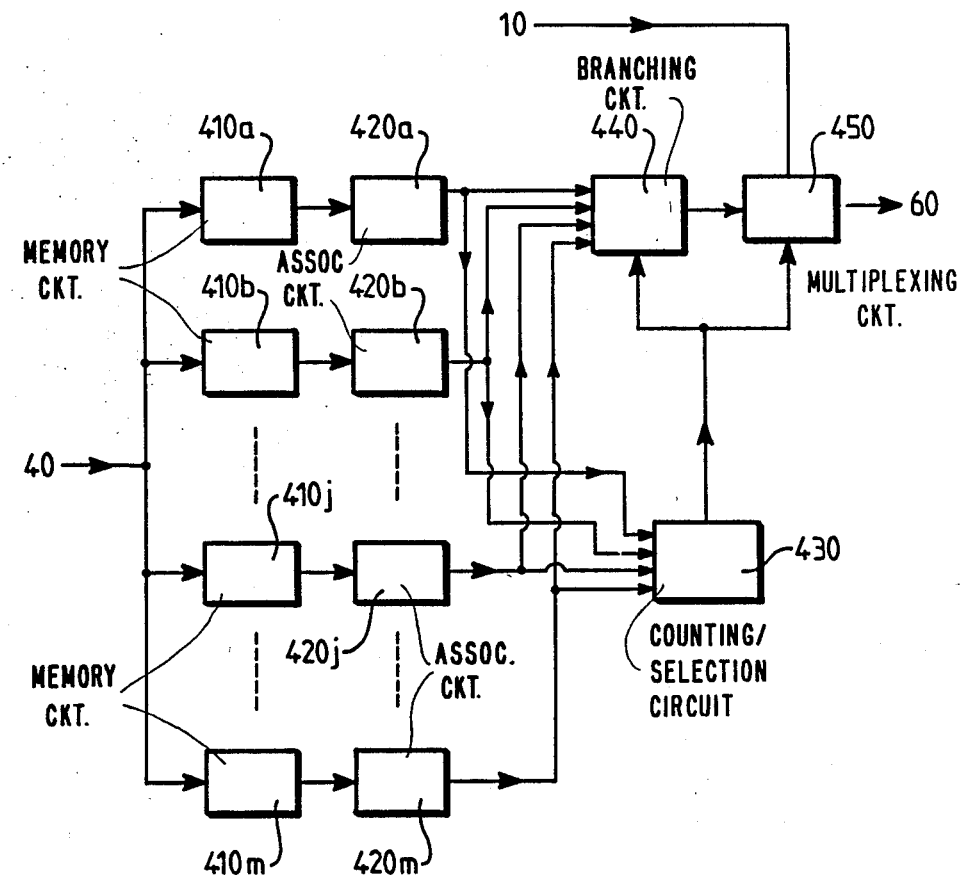
FIG. 5 shows an embodiment of the coding circuit of FIG. 1.
Figure 6A:
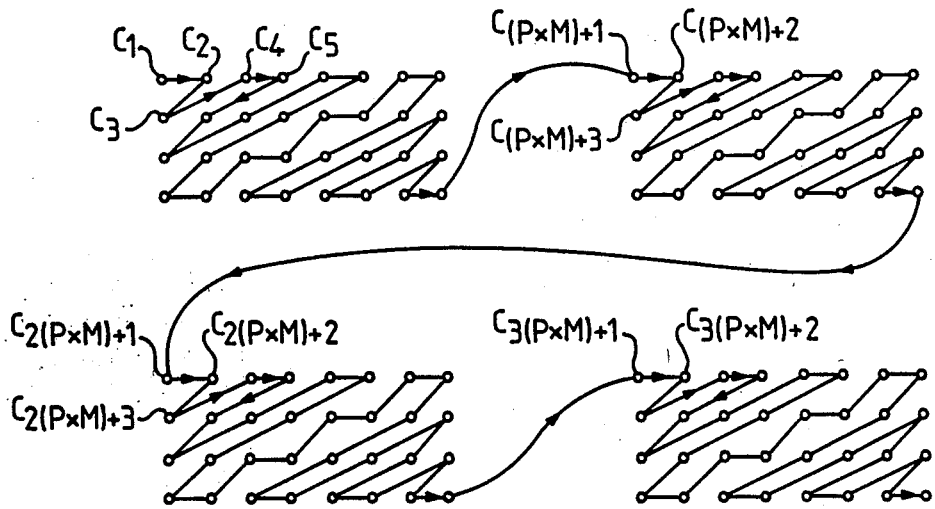
FIGS. 6a and 6b show two types of data scanning, so as to be read in the coding circuit.
Figure 6B:
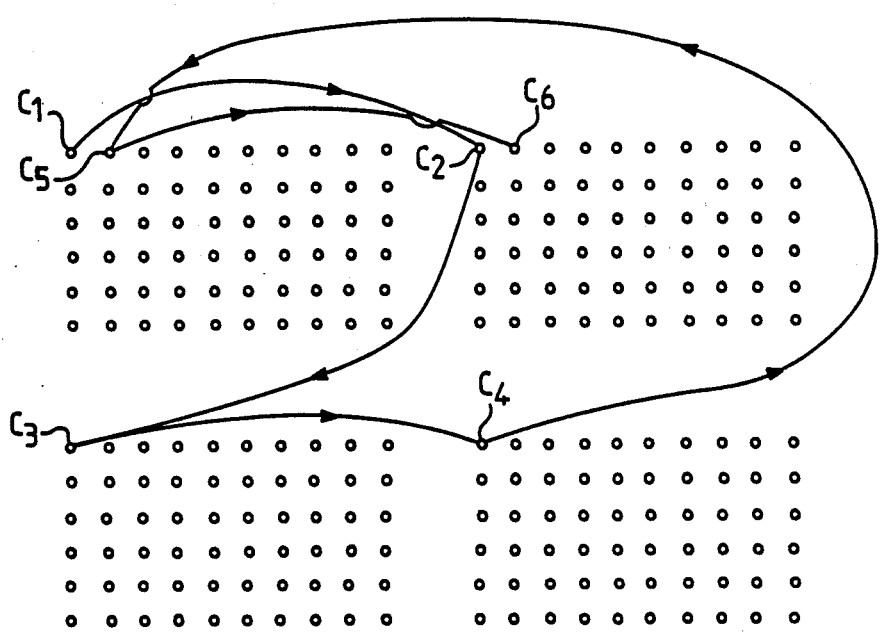

The output of the quantization circuit 440, which forms the output of the normalization and quantizing circuit 40, is applied to a coding circuit 50 which transmits, for each non-zero quantized value, a word among a predefined set of words, on the one hand, denoted as Huffman code and stored in a memory, and, on the other hand, another word representing the address of the coded value. This address is defined along a one-dimensional scanning of the three-dimensional block by coding the length of the sequences of zero values. Such a coding circuit having a variable length is of the conventional type. In its place it is also possible to provide a coding circuit comprising m paths in parallel each receiving all the values to be coded, as is shown in the embodiment of FIG. 5. More specifically, these values are applied to a memorizing circuit 410a, 410b, . . . . , 410j, . . . , 410m in accordance with the path, which circuit itself comprises two memories functioning as flip-flops: for a given three-dimensional block, the values are written in one of these two memories while the values of the preceding block are read from the other memory in an order corresponding to the new scanning. FIGS. 6a and 6b show two scanning types for this reading operation. The type shown in FIG. 6a permits minimizing the rate for the blocks having a fixed content, while that shown in FIG. 6b is interesting for the mobile parts. The output of each memorizing circuit 410a to 410m is applied to the associated circuit 420a to 420m, which associated circuits are the coding circuits realizing the variable length coding in the manner described in U.S. Pat. No. 4,394,774. The different outputs of the circuits 420a to 420m are applied to the counting and selection circuit 430. This circuit counts for each three-dimensional block, the number of bits utilized for coding the block for each scanning and then determines the scanning which minimizes the rate for each three-dimensional block, controls the output of the branching circuit 440 which has stored the bits from various coding circuits and ensures the transfer, from the branching circuit 440 to a multiplexing circuit 450, of the bits corresponding to the best coding of the three-dimensional block. The multiplexing circuit 450 multiplexes these bits by the scanning index chosen, which must be transmitted to the decoding arrangement for reconstruction of the block and also ensures the transmission, at the start of each group of N images, of principal displacement vectors determined for these images.

The coding arrangement finally comprises at the output of the coding circuit 50 a rate-control memory 60 which guarantees that the rate of the output is constant and which is realized in the manner described in U.S. Pat. No. 4,394,774.

The decoding arrangement (see FIG. 2) comprises a buffer memory 70 which is similar to the memory 60 of the coding arrangement, and a decoding circuit 80 realized in the manner described in U.S. Pat. No. 4,394,774. The variable length decoding thus provided permits recovering the scanning index chosen for each three-dimensional block and the principal displacements which are necessary to reconstitute the images. An inverse quantizing and normalization circuit 90 realizes the scan conversion with the aid of two flip-flop memories by switching the address generators of a memorizing circuit of the type 410 (FIG. 5) and the reconstruction of the coefficient values based on values transmitted by reconstruction of the quantization steps of the coefficients with the aid of the state of the rate-control memory 60 used at the transmitter end, of the position of the coefficient and of the content of the block (after classification). The transform circuit 100 is identical to the circuit 30 but each time realizes an inverse orthogonal transform. Finally, a circuit 110 having a structure similar to that of the circuit 20 by exchanging the read and write address generators, reconstitutes the standard line scanning, the principal displacement vectors corresponding to these final images (and coming from the decoding circuit 80) being identical to those stored during the coding of N images.

It should be noted that the present invention is not limited to embodiments which have been described and shown and, based on these embodiments, modifications can be proposed without departing from the scope of the invention.

It is to be noted in particular that if the digital video signals to be treated have an interlaced format, the steps for estimating the principal movement and for scan conversion, addressed to signals having a non-interlaced format, are preceded by a step for converting the interlaced format into a non-interlaced format. In carrying out the coding method, the coding arrangement thus comprises at its head a circuit for converting the interlaced format into a non-interlaced format.

It is equally evident that the coding method and arrangement according to the invention can be used with other types of orthogonal transforms, for example with Hadamard or de Haar transforms or even with orthogonal transforms which are of a type which is different, dependent on the direction considered, for example, in a non-limitative manner, with the discrete cosine transforms (DCT) for the directions in the plane of the image and with a Hadamard transform for the third direction in accordance with the time axis.

I claim:

1. A method of coding images converted into digital video signals in accordance with a format composed of three-dimensional block of said signals, characterized in that it comprises the following preliminary steps:
    (a) estimation of a principal movement from image to image for associating a displacement vector with each image, with respect to the preceding image, said principal vector being the vector for which the image-to-image difference is minimum, and;
    (b) scan conversion with a view to defining the format of the three-dimensional blocks by dividing the sequence of video signals corresponding to images into groups each corresponding to N consecutive images and by defining within each of these groups the three-dimensional blocks including M lines and P pixels per line in the image plane and N successive planes corresponding to N images of the group, the N two-dimensional blocks of M lines by P pixels which compose each three-dimensional block of one and the same group being spatially shifted from one image to the next by the displacement vector estimated for each image.

2. A coding method as claimed in claim 1, characterized in that the preliminary steps for estimating the principal movement and for scan conversion are preceded by a step for converting the interlaced format into a non-interlaced format.

3. An arrangement for coding images converted into digital video signals in accordance with a format composed of three-dimensional blocks of said signals, said arrangement notably comprising a circuit for coding digital values which are representative of the signals, characterized in that:
    the coding arrangement also comprises, prior to the coding circuit, a circuit for estimating the principal movement from image to image and a scan-conversion circuit;
    the circuit for estimating the principal movement comprises a register for storing, on the basis of input samples which it receives, samples which are representative of each image, a first and a second memory for alternately writing in one of them the assembly of samples which are representative of an image, referred to as current image and for simultaneously reading out of the other one of the two memories the samples which are representative of an image which is the image previously written, a subtractor for calculating the inter-frame error by means of a difference between the samples which have been read and the corresponding input samples, a circuit for calculating the absolute value, a circuit for calculating the cumulated error and a circuit for determining the minimum cumulated error and for calculating the displacement associated with the minimum cumulated error, whose output is a displacement vector of the current image based on the preceding image and which is applied to the scan-conversion circuit and to the coding circuit;

said scan-conversion circuit comprises a third and a fourth memory for storing input samples in the number corresponding to the desired temporal length for the three-dimensional blocks, said memories equally functioning as flip-flops, and a circuit for constituting the three-dimensional blocks by associating, in a number corresponding to the temporal length of these blocks, two-dimensional spatial blocks shifted one with respect to the next by the corresponding displacement vector determined by the circuit for estimating the principal movement.

4. A coding arrangement as claimed in claim 3, characterized in that these circuits for estimating the principal movement and for scan conversion are preceded by a circuit for converting the interlaced format into a non-interlaced format.

5. A coding arrangement as claimed in any one of claims 3 and 4, characterized in that the register for storing the representative samples is controlled by a logic AND gate which is connected to the output of two circuits for dividing the frequency of the pixels and the line frequency, and in that the outputs of the dividing circuits are connected to the circuit for calculating the displacement.

6. A decoding arrangement for digital video signals being coded before transmission or storage, with the aid of a coding arrangement comprising before the coding operation itself, means for defining, with the aid of at least one image-to-image motion information component, blocks having three-dimensional data associating in N successive images N two-dimensional blocks of M lines and P pixels per line of the same spatial dimensions but spatially shifted, from one image to the next, as a function of the corresponding motion information component, said motion information components being also coded and transmitted, characterized in that said decoding arrangement comprises a buffer memory receiving the transmitted signals, a circuit for decoding these signals in accordance with a processing operation which is reciprocal to that effected for coding at the transmitter end, and a circuit for reconstituting the line scan based on the decoded video signals corresponding to the three-dimensional blocks and on the motion information components defining the format of said blocks.

* * * * *